(12) United States Patent
Zhao et al.

(10) Patent No.: US 11,652,345 B2
(45) Date of Patent: May 16, 2023

(54) DRIVING APPARATUS FOR RECLOSING APPARATUS AND DRIVING METHOD THEREOF

(71) Applicant: Schneider Electric Industries SAS, Rueil-Malmaison (FR)

(72) Inventors: Haijun Zhao, Shanghai (CN); Ying Shi, Shanghai (CN); Jiamin Chen, Shanghai (CN); Fabien Dechamps, Eybens (FR); Zhangji Zhou, Shanghai (CN); Shuang Sun, Shanghai (CN); Bing Shuang, Shanghai (CN); Lei Shi, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 17/378,044

(22) Filed: Jul. 16, 2021

(65) Prior Publication Data
US 2022/0021197 A1 Jan. 20, 2022

(30) Foreign Application Priority Data
Jul. 16, 2020 (CN) .......... 202010685890.X

(51) Int. Cl.
*H02H 7/08* (2006.01)
*H02H 3/06* (2006.01)

(52) U.S. Cl.
CPC .......... *H02H 3/06* (2013.01); *H02H 7/0833* (2013.01)

(58) Field of Classification Search
CPC .... H02J 9/061; H02J 9/06; H02J 9/005; H02J 9/062; H02J 7/345; H02J 7/0068; H02J 7/34; H02J 7/00; H02J 7/35; H02H 3/00–06; H02H 3/30–33; H02H 3/381; H03K 17/161; H03K 17/302; H03K 17/56; H03K 17/567; H03K 17/60; H03K 17/687; H03K 17/6871; H03K 17/16; H03K 17/30; H03K 17/601; H03K 17/64; H03K 17/691; H03K 17/731; H03K 17/10; H03K 17/102;
(Continued)

(56) References Cited

U.S. PATENT DOCUMENTS

| 2016/0301200 A1 | 10/2016 | Niehoff |
| 2016/0301204 A1* | 10/2016 | Niehoff .................. H02H 1/06 |
| 2020/0099217 A1 | 3/2020 | Meisinger et al. |

OTHER PUBLICATIONS

Examination Report dated Mar. 1, 2022 for corresponding Indian Patent Application No. 202144031905, 4 pages.

* cited by examiner

*Primary Examiner* — Bryan R Perez
(74) *Attorney, Agent, or Firm* — Locke Lord LLP

(57) ABSTRACT

The present disclosure relates to a driving apparatus for a reclosing apparatus and a driving method thereof. The driving apparatus comprises a first energy storage unit, a timing unit, a control unit, and a first power supply unit, a second energy storage unit and a driving unit. The timing unit outputs a first enable signal; the control unit outputs a second enable signal or a third enable signal; the first power supply unit enables the second energy storage unit to receive the power when receiving the second enable signal, and enables the second energy storage unit to discharge when receiving the third enable signal; the second energy storage unit receives and stores the power via the first power supply unit; and the driving unit provides the power stored in the first energy storage unit to the reclosing apparatus when a predetermined condition is satisfied.

20 Claims, 6 Drawing Sheets

(58) Field of Classification Search
CPC .... H03K 17/107; H03K 17/12; H03K 17/122; H03K 17/127; H03K 19/00346; H03K 19/00353; H03K 19/00361; H03K 19/003; H03K 19/00307; H03K 19/00315
See application file for complete search history.

DRIVING APPARATUS FOR RECLOSING APPARATUS AND DRIVING METHOD THEREOF

TECHNICAL FIELD

The present disclosure relates to a driving apparatus for a reclosing apparatus and a driving method thereof.

BACKGROUND

A motor protector is usually used to realize a start and protection of a motor. Protection functions of the motor protector may include thermal overload protections, ground fault protections, phase loss protections, etc. After a Micro Control Unit (MCU) detects that the load current of the motor is too large, a trip apparatus of the motor protector must be triggered to operate to cut off the current of the motor, which is called thermal overload protection.

In some cases, it may be necessary for a reclosing apparatus in the motor protector to perform automatic reclosing after a predetermined time since the motor protector trips due to thermal overload, so that the motor may be restarted to run without manual intervention. However, for the timing function for the period of time after the trip until the motor restarts to run, the commonly used solution is to use an internal timer of the MCU to implement. However, for long-term timing, high requirements are put forward on a power consumption of the MCU and the capacitance value of the energy storage capacitor that provides power to the MCU after the power is off, which is not conducive to the cost control and miniaturization requirements of the product.

SUMMARY OF THE DISCLOSURE

The present disclosure relates to a driving apparatus for a reclosing apparatus and a driving method thereof, which may drive the reclosing apparatus according to the user's wishes after the motor is powered off for a predetermined time without the need for an MCU to participate in the timing.

According to one aspect of the present disclosure, there is provided a driving apparatus for a reclosing apparatus, the driving apparatus being supplied with power through direct current converted from alternating drive current of a motor by a rectifier apparatus, and the driving apparatus comprising a first energy storage unit, a timing unit, a control unit, a first power supply unit, a second energy storage unit, and a driving unit, among which, the first energy storage unit is configured to receive and store the power, and supply power to the timing unit and the reclosing apparatus; the timing unit is configured to output a first enable signal after determining that a power-off time of the motor reaches a first time threshold based on a voltage of the first energy storage unit; the control unit is configured to output a second enable signal based on a reclosing function being enabled, and output a third enable signal based on determining that the reclosing function is not enabled; the first power supply unit is configured to enable the second energy storage unit to receive the power when receiving the second enable signal, and to enable the second energy storage unit to discharge when receiving the third enable signal; the second energy storage unit is configured to receive and store the power via the first power supply unit; and the driving unit is configured to provide the power stored in the first energy storage unit to the reclosing apparatus when a predetermined condition is satisfied, and the predetermined condition requires that the timing unit outputs the first enable signal and a voltage of the second energy storage unit reaches a first voltage threshold.

According to another aspect of the present disclosure, there is provided a driving method applied to a driving apparatus for a reclosing apparatus, the driving apparatus being supplied with power through direct current converted from alternating drive current of a motor by a rectifier apparatus, and the driving apparatus includes a first energy storage unit, a timing unit, a control unit, a first power supply unit, a second energy storage unit, and a driving unit. The driving method comprises: receiving and storing the power by the first energy storage unit; outputting a first enable signal, by the timing unit, after determining that a power-off time of the motor reaches a first time threshold based on a voltage of the first energy storage unit; outputting a second enable signal based on a reclosing function being enabled, and outputting a third enable signal based on determining that the reclosing function is not enabled by the control unit; enabling the second energy storage unit to receive the power by the first power supply unit when receiving the second enable signal, and enabling the second energy storage unit to discharge by the first power supply unit when receiving the third enable signal; and providing, by the driving unit, the power stored in the first energy storage unit to the reclosing apparatus when a predetermined condition is satisfied, and the predetermined condition requiring that the timing unit outputs the first enable signal and a voltage of the second energy storage unit reaches a first voltage threshold.

According to the embodiments of the present disclosure, a separate timing unit is provided in the driving apparatus, and there is no need for the MCU to participate in the timing operation after the power is cut off due to the trip, so that there is no need to deliberately select an MCU of low-power consumption, which helps to control product costs.

In addition, the driving apparatus of the embodiments of the present disclosure may enable the user to select whether to enable the reclosing function, thereby giving the user more freedom of choice.

BRIEF DESCRIPTION OF THE DRAWINGS

The aspects, features and advantages of the present disclosure will become clearer and easier to understand through the following description of the embodiments in conjunction with the accompanying drawings, among which.

DESCRIPTION OF THE EMBODIMENTS

The present disclosure will be described in detail below with reference to exemplary embodiments of the present disclosure. However, the present disclosure is not limited to the embodiments described here, and it may be implemented in many different forms. The described embodiments are only used to make the present disclosure thorough and complete, and to fully convey the concept of the present disclosure to those skilled in the art. The features of the various described embodiments may be combined or replaced with each other, unless explicitly excluded or should be excluded according to the context.

As described above, in some cases, a reclosing apparatus in a motor protector is required to perform reclosing after a predetermined time. Some implementations use an MCU as a real-time clock to time whether the predetermined time has been reached. Such an implementation requires that after the MCU is powered off due to a trip, a separate power supply unit is provided for the MCU to enable it to perform timing. Therefore, it is necessary to select an MCU of low-power consumption. Further, the MCU needs to run in a normal working mode when the motor is running, and needs to run in a real-time clock working mode after the motor is powered off. Therefore, it may be necessary to switch frequently between the two modes for the MCU, making its software control more complicated. In addition, if a reclosing function is used by default, then in a case where a motor overload is not eliminated, it will cause the motor to frequently work under an overload current, which will cause a risk of burning. Therefore, it is necessary to be able to drive the reclosing apparatus according to the user's wishes on whether to enable the reclosing function.

The embodiments of the present disclosure propose a driving apparatus for the reclosing apparatus, in which driving apparatus a separate timing unit is provided, and an energy storage unit that supplies power to the reclosing apparatus supplies power to the timing unit. Therefore, the MCU does not need to participate in the timing operation after the power is cut off due to the trip, and only participates in a logic control operation before power-off, so there is no need to deliberately select an MCU of low-power consumption. In addition, the reclosing apparatus may be driven according to the user's wishes on whether to enable the reclosing function, thereby giving the user greater application adaptability.

Figure 1:
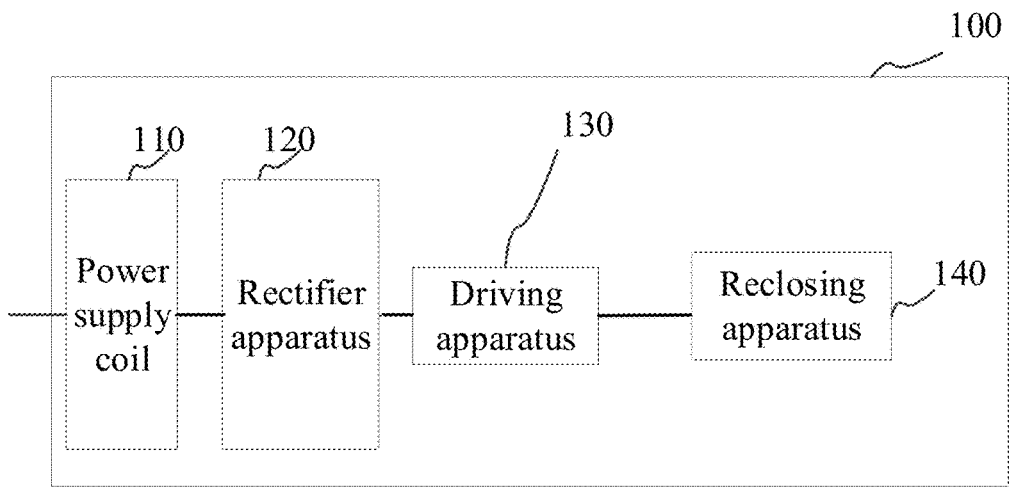
FIG. 1 is a schematic module diagram of relevant parts of a motor protector according to an embodiment of the present disclosure.

FIG. 1 is a schematic module diagram of relevant parts of a motor protector according to an embodiment of the present disclosure. As shown in FIG. 1, the motor protector 100 may include a power supply coil 110, a rectifier apparatus 120, a driving apparatus 130 and a reclosing apparatus 140. Although not shown in FIG. 1, it may be understood that the motor protector 100 may also include some other apparatuses that implement specific functions. For example, the motor protector 100 may include a trip apparatus to perform a trip operation to cut off the current of the motor after detecting a thermal overload of the motor. The power supply coil 110 induces alternating current (AC) in the power supply circuit of the motor, and then the rectifier apparatus 120 converts the induced AC into direct current (DC). The driving apparatus 130 receives the DC, and then drives the reclosing apparatus 140 in the motor protector 100. The reclosing apparatus 140 is configured to realize the automatic reclosing function after a predetermined time has elapsed if power is cut off due to the thermal overload of the motor (that is, the trip apparatus trips). In some embodiments, the power supply coil 110 may be omitted, and for example, the power supply circuit directly connected to the motor is used to obtain power, as long as the power of the driving apparatus is supplied by the power supply circuit of the motor, that is, the driving apparatus is supplied with power through the direct current converted from the alternating drive current of the motor by the rectifier apparatus.

Figure 2:
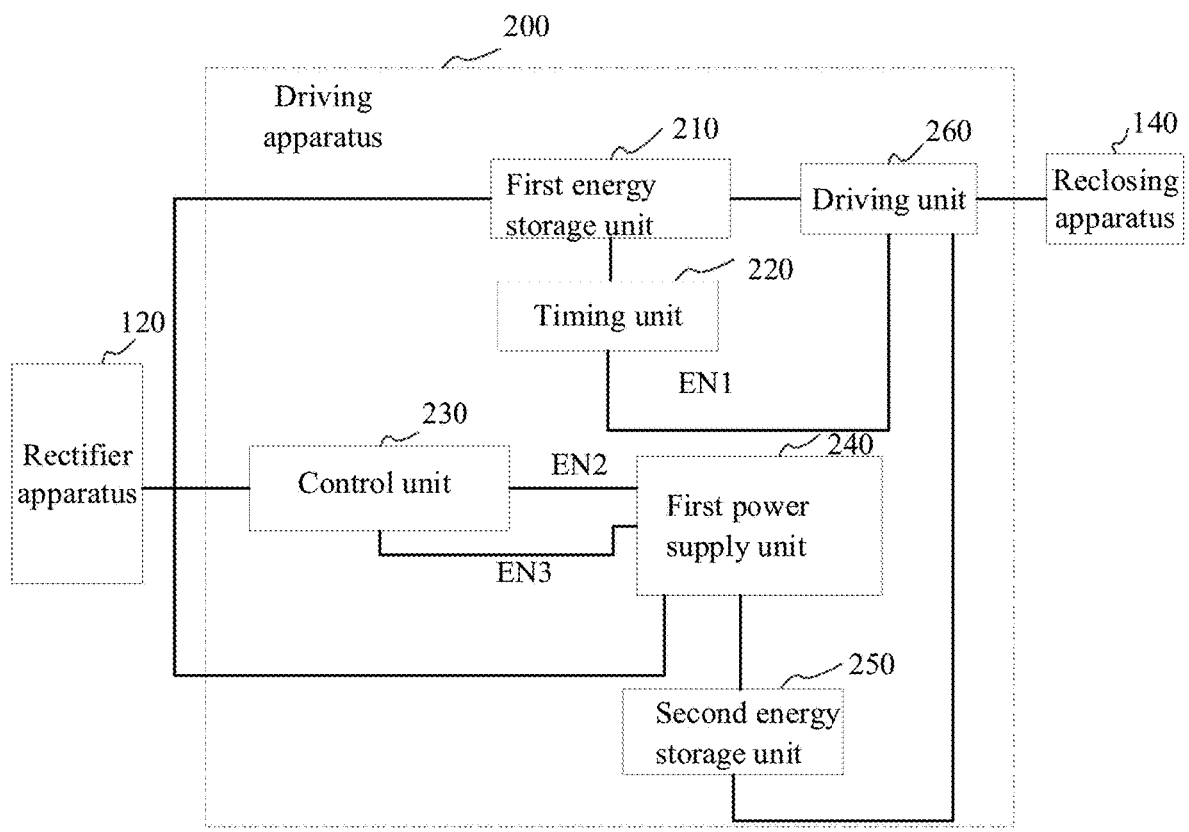
FIG. 2 is a schematic circuit module diagram of a driving apparatus for a reclosing apparatus according to an embodiment of the present disclosure.

FIG. 2 is a schematic circuit module diagram of the driving apparatus 200 for a reclosing apparatus according to an embodiment of the present disclosure. The driving apparatus 200 may include a first energy storage unit 210 and a timing unit 220. The first energy storage unit 210 is configured to receive power from the rectifier apparatus 120 before the trip apparatus of the motor protector trips, and configured to store the power. When the rectifier apparatus 120 no longer outputs power due to the trip action, the first energy storage unit 210 may use the stored power to supply power to the timing unit 220 and the reclosing apparatus 140, so as to ensure that the timing unit 220 may operate after the motor is powered off, and to ensure that there is sufficient driving power to drive the reclosing apparatus 140 when it is necessary to perform the reclosing.

The timing unit 220 is configured to output a first enable signal EN1 after determining that a power-off time of the motor reaches a first time threshold based on a voltage of the first energy storage unit 210. The separate timing unit 220 is provided in the driving apparatus 200 according to the embodiment of the present disclosure to implement the timing function, so as to perform reclosing after a predetermined time has elapsed (i.e., the power-off time of the motor reaches the first time threshold). After the motor is powered off, the power stored in the first energy storage unit 210 begins to be released. Therefore, there is a corresponding relationship between the voltage of the first energy storage unit and the power-off time of the motor, and the power-off time of the motor may be determined based on the voltage of the first energy storage unit. Thus, the timing unit 220 is connected to the first energy storage unit 210, is powered by it, and detects its voltage. When it is detected that the voltage of the first energy storage unit reaches a certain voltage value, it may be determined that the power-off time of the motor reaches a first time threshold Tth1, thereby the first enable signal EN1 is outputted. Therefore, there is no need for the MCU to participate in the timing operation after the power is cut off due to the trip, so there is no need for the MCU to switch frequently between the normal working mode and the real-time clock working mode, and there is no need to deliberately select an MCU of low-power consumption, which makes the MCU's design more simple and conducive to cost control.

The driving apparatus 200 may further include a control unit 230, for example, the MCU. As described above, the driving apparatus according to the present disclosure may determine whether to drive the reclosing apparatus according to the user's wishes. In other words, the user may set whether to enable the reclosing function, for example, through the user interface. The control unit 230 may identify whether the reclosing function is enabled, and thereby output a second enable signal EN2 based on the reclosing function being enabled, and output a third enable signal EN3 based on determining that the reclosing function is not enabled.

After the trip apparatus performs a trip action due to thermal overload, the motor protector has no power supply current, and the control unit 230 also stops working. Therefore, the control unit 230 may output the second enable signal EN2 or the third enable signal EN3 before detecting an overcurrent and issuing a trip command to the trip apparatus of the motor protector, so as to indicate whether the user enables the reclosing function.

Before the predetermined time has elapsed, the driving apparatus 200 will not drive the reclosing apparatus 140 to perform reclosing. Therefore, before that, it is necessary to hold the indication signal (the second enable signal EN2 or the third enable signal EN3) on whether the user enables the reclosing function, so that after the predetermined time has elapsed, it is determined whether to perform reclosing according to the user's indication. In this case, as shown in FIG. 2, the driving apparatus 200 may further include a first power supply unit 240 and a second energy storage unit 250. The second energy storage unit 250 is configured to receive and store the power from the rectifier apparatus 120 via the first power supply unit 240. The first power supply unit 240 is configured to enable the second energy storage unit 250 to receive power from the rectifier apparatus 120 when receiving the second enable signal EN2, and enable the second energy storage unit 250 to discharge when receiving the third enable signal EN3. Therefore, a voltage of the second energy storage unit 250 may correspond to the above-mentioned indication signal. That is, the voltage of the second energy storage unit 250 reaching a first voltage threshold Vth1 may indicate that the reclosing function is enabled, and the voltage of the second energy storage unit 250 being lower than the first voltage threshold Vth1 may indicate that the reclosing function is disabled.

The driving apparatus 200 may further include a driving unit 260 configured to provide the power stored in the first energy storage unit 210 to the reclosing apparatus 140 when a predetermined condition is satisfied. In one example, the predetermined condition may require that the timing unit 220 outputs the first enable signal EN1 (corresponding to the motor being powered off for the predetermined time) and that the voltage of the second energy storage unit 250 reaches the first voltage threshold Vth1 (corresponding to the user enabling the reclosing function). In this way, it is possible to drive the reclosing apparatus 140 in the motor protector after the predetermined time and depending on the user's wishes.

Further, since the reclosing only needs to be performed after the motor is powered off, in one example, the predetermined condition may further require that the motor has been powered off. That is to say, only when three conditions (which include that the timing unit 220 outputs the first enable signal EN1, the voltage of the second energy storage unit 250 reaches the first voltage threshold Vth1, and the motor has been powered off) are satisfied, the driving unit 260 provides the power stored in the first energy storage unit 210 to the reclosing apparatus 140, which may further ensure that the reclosing function is disabled during the power-on operation of the motor, so as to avoid misoperation. As will be described in further detail below, it may be determined whether the motor is powered off by detecting whether there is a voltage at the power input terminal of the MCU.

Figure 3:
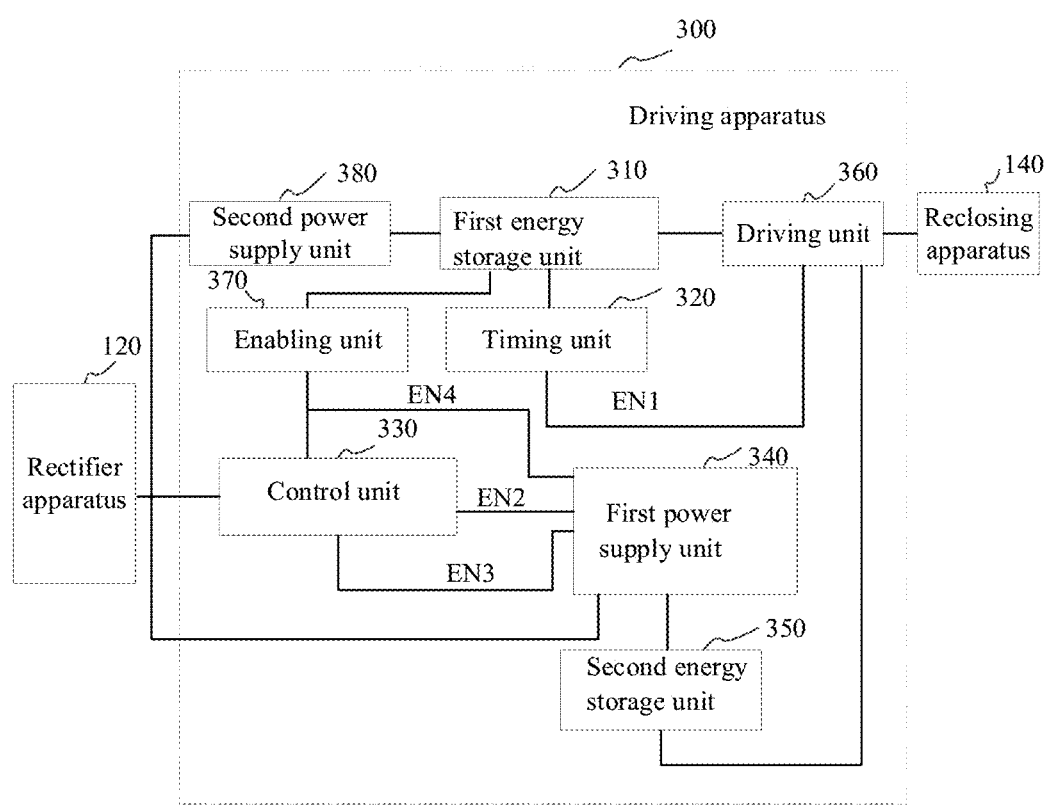
FIG. 3 is a schematic circuit module diagram of a driving apparatus according to another embodiment of the present disclosure.

Since the first energy storage unit 210 is used to supply power to the timing unit 220 and the reclosing apparatus 140 after the power-off to realize the reclosing function, it is necessary to ensure that the first energy storage unit 210 stores enough power, that is, the voltage of the first energy storage unit 210 needs to reach a predetermined voltage threshold to ensure that subsequent reclosing may be performed. Therefore, in another embodiment, the driving apparatus may further include an enabling unit, as shown in FIG. 3. FIG. 3 is a schematic circuit module diagram of a driving apparatus 300 according to another embodiment of the present disclosure. The difference between FIG. 3 and FIG. 2 is that the driving apparatus 300 in FIG. 3 further includes an enabling unit 370 for outputting a fourth enable signal EN4 based on determining that the voltage of the first energy storage unit 310 reaches a second voltage threshold Vth2. The first power supply unit 340 controls the second energy storage unit 350 to receive power based on both the second enable signal EN2 output by the control unit 330 and the fourth enable signal EN4 output by the enabling unit 370. That is, only when the first power supply unit 340 receives both the second enable signal EN2 and the fourth enable signal EN4, the second energy storage unit 350 is enabled to receive the power. Therefore, it may be ensured that the first energy storage unit 210 stores enough power before the reclosing apparatus 140 is subsequently driven, so as to avoid the situation that the reclosing apparatus 140 is driven when the first energy storage unit 210 does not store enough power due to, for example, a wrong output of the control unit 330 or the like.

Further, as shown in FIG. 3, the fourth enable signal EN4 output by the enabling unit 370 may also be provided to the control unit 330. In this case, the control unit 330 no longer outputs the second enable signal EN2 only based on the reclosing function being enabled, but outputs the second enable signal EN2 based on both the reclosing function being enabled and receiving the fourth enable signal EN4. The advantage of this is that both the first power supply unit 340 and the control unit 330 have verified that the first energy storage unit 210 has stored enough power, and a double guarantee is realized.

In order to increase the power stored by the first energy storage unit 310, it may be considered to increase the input voltage of the first energy storage unit 310. For example, if the first energy storage unit 310 is composed of a capacitor, since the power stored by the capacitor is related to its capacitance value and the DC voltage applied to the capacitor, the capacitor with a small capacitance value may be used to store sufficient power by increasing the voltage applied to the capacitor, so as to supply power to the timing unit 320 and the reclosing apparatus 140. Therefore, in yet another embodiment, the driving apparatus 300 may further include a second power supply unit 380, as shown in FIG. 3. The second power supply unit 380 is connected between the rectifier apparatus 120 and the first energy storage unit 310 and is configured to receive power from the rectifier apparatus 120 and increase a voltage output to the first energy storage unit 310.

According to the above-mentioned embodiments of the present disclosure, the separate timing unit is provided in the driving apparatus, and there is no need for the MCU to participate in the timing operation after the power is cut off due to the trip, so that there is no need to deliberately select the MCU of low-power consumption. In addition, the driving apparatus of the embodiments of the present disclosure may enable the user to select whether to enable the reclosing function, thereby giving the user more freedom of choice.

Figure 4:
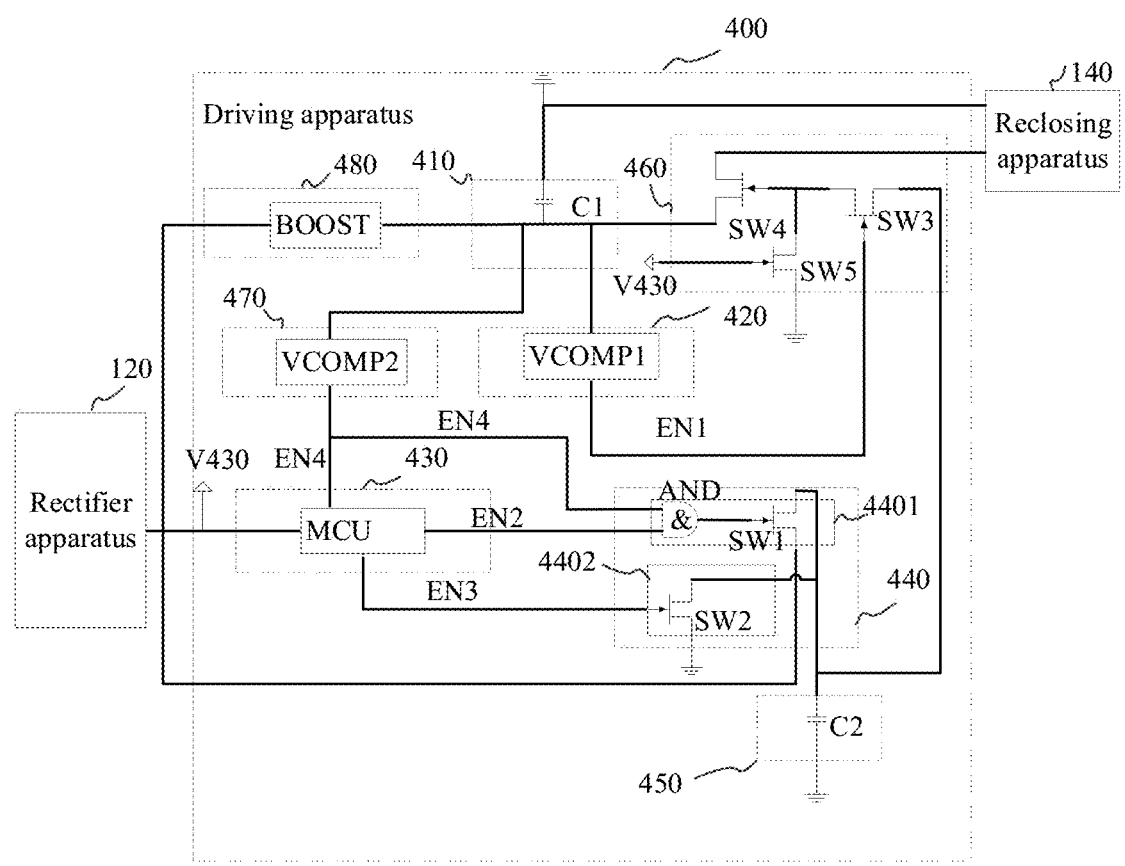
FIG. 4 shows a schematic circuit diagram of a driving apparatus according to an embodiment of the present disclosure.

Each unit of the driving apparatus of the present disclosure may be implemented by various specific circuits. FIG. 4 shows a schematic circuit diagram of a driving apparatus 400 according to an embodiment of the present disclosure. It should be noted that the specific structure of each unit in FIG. 4 may be separately applied or replaced by other suitable structures.

As shown in FIG. 4, a first energy storage unit 410 may include a first capacitor C1. The first capacitor C1 may be connected between the rectifier apparatus 120 and a reference ground. In a case where the driving apparatus 400 includes a second power supply unit 480 connected to the rectifier apparatus 120, the first capacitor C1 may be connected to the second power supply unit 480, thereby receiving an increased input voltage. The first capacitor C1 is configured to receive the power and store the power, and use the stored power to supply power to the timing unit 420 and the reclosing apparatus 140. The second power supply unit 480 may include a booster circuit BOOST to receive the power and increase the voltage output to the first capacitor C1, so that the first capacitor C1 with a small capacitance value may be used to store enough power, which is conducive to the miniaturization of the product design. It should be noted that although the first energy storage unit 410 is shown as the first capacitor C1 in FIG. 4, the first energy storage unit is not limited to a capacitor element. In one embodiment, the first energy storage unit may also be an energy storage battery.

The timing unit 420 may include a first voltage comparison circuit VCOMP1. An input terminal of the first voltage comparison circuit VCOMP1 is connected to the first energy storage unit 410 to obtain its voltage, and an output terminal of the first voltage comparison circuit VCOMP1 is connected to the driving unit 460. There is a corresponding relationship between a voltage of the first energy storage unit 410 and the power-off time of the motor, and the power-off time of the motor may be determined based on the voltage of the first energy storage unit 410. Therefore, after the motor is powered off due to the trip, the first energy storage unit 410 supplies power to the first voltage comparison circuit VCOMP1, and the first voltage comparison circuit VCOMP1 detects the voltage of the first energy storage unit 410, so that the first voltage comparison circuit VCOMP1 outputs the first enable signal EN1 when detecting that the voltage of the first energy storage unit 410 reaches a certain voltage value. At this time, it means that the power-off time of the motor has reached the first time threshold Tth1. The first voltage comparison circuit VCOMP1 may be implemented by existing chips, for example, a TPS3701 window voltage detector.

The control unit 430 also receives power from the rectifier apparatus 120, and may include a micro control unit (MCU). MCU may usually be used to detect overload current, and control whether to drive the trip apparatus, etc. In the present embodiments, the MCU may identify whether the reclosing function is enabled, and output the second enable signal EN2 based on the reclosing function being enabled, and output the third enable signal EN3 based on determining that the reclosing function is not enabled. In a case where the driving apparatus 400 includes the enabling unit 470, the MCU may output the second enable signal EN2 based on the reclosing function being enabled and receiving the fourth enable signal EN4 output by the enabling unit 470.

The first power supply unit 440 may include a charging circuit 4401. The charging circuit 4401 is connected between the output terminal of the rectifier apparatus 120 and the second energy storage unit 450, and is configured to enable the second energy storage unit 450 to receive the power from the rectifier apparatus 120 based on the second enable signal EN2.

The charging circuit 4401 may include a first electronic switch SW1. The first electronic switch SW1 is connected between the output terminal of the rectifier apparatus 120 and the second energy storage unit 450, and the first output terminal of the control unit 430 is connected to a control terminal of the first electronic switch SW1. After receiving the second enable signal EN2 output by the control unit 430, the first electronic switch SW1 is turned on, so that the second energy storage unit 450 may receive the power from the rectifier apparatus 120.

There are many types of commonly used electronic switches, for example, IGBT, GTO (Gate Turn-Off Thyristor), triode, MOS (Metal-Oxide Semiconductor) transistor, etc., which may be chosen by those skilled in the art according to actual application scenarios. For example, in the embodiments of the present disclosure, when the first electronic switch SW1 is a MOS transistor, its gate is a control terminal and is connected to a first output terminal of the control unit 430; its source and drain are respectively connected to the second energy storage unit 450 and the output terminal of the rectifier apparatus 120.

In the case that the driving apparatus 400 includes the enabling unit 470, the charging circuit 4401 enables the second energy storage unit 450 to receive the power from the rectifier apparatus 120 only when receiving both the second enable signal EN2 and the fourth enable signal EN4 output by the enabling unit 470. In this case, the charging circuit 4401 may include the first electronic switch SW1 and a logic AND circuit "AND". The first electronic switch SW1 is connected between the output terminal of the rectifier apparatus 120 and the second energy storage unit 450. Two input terminals of the logic AND circuit "AND" are respectively connected to the first output terminal of the control unit 430 and the output terminal of the enabling unit 470, and the output terminal of the logic AND circuit "AND" is connected to the control terminal of the first electronic switch SW1. When the two input terminals of the logic AND circuit "AND" receive the second enable signal EN2 and the fourth enable signal EN4, respectively, the output signal from the output terminal of the logic AND circuit "AND" enables the first electronic switch SW1 to be turned on, so that the second energy storage unit 450 may receive power from the rectifier apparatus 120.

The first power supply unit 440 may further include a discharging circuit 4402. The discharging circuit 4402 is connected between the reference ground and the second energy storage unit 450 for discharging the second energy storage unit 450 based on the third enable signal EN3.

The discharging circuit 4402 may include a second electronic switch SW2. The second electronic switch SW2 is connected between the reference ground and the second energy storage unit 450, and the second output terminal of the control unit 430 is connected to the control terminal of the second electronic switch SW2. After receiving the third enable signal EN3 output by the control unit 430, the second electronic switch SW2 is turned on, so that the second energy storage unit 450 may discharge.

In the embodiments of the present disclosure, when the second electronic switch SW2 is a MOS transistor, its gate is the control terminal, which is connected to the second output terminal of the control unit 430; its source and drain are respectively connected to the reference ground and the second energy storage unit 450.

The second energy storage unit 450 may include a second capacitor C2. As described above, the second capacitor C2 may receive and store power through the charging circuit 4401 of the first power supply unit 440, or discharge through the discharging circuit 4402 of the first power supply unit 440.

The enabling unit 470 may include a second voltage comparison circuit VCOMP2. An input terminal of the second voltage comparison circuit VCOMP2 is connected to the first energy storage unit 410 to obtain its voltage, and an output terminal of the second voltage comparison circuit VCOMP2 is connected to the first power supply unit 440. When the motor is running normally, the first energy storage unit 410 may receive and store power. Based on the voltage of the first energy storage unit 410, it may be determined whether the first energy storage unit 410 has stored enough power to supply power to the timing unit 420 and the reclosing apparatus 140 when the power is cut off. Therefore, the second voltage comparison circuit VCOMP2 may be set to output the fourth enable signal EN4 when detecting that the voltage of the first energy storage unit 410 reaches the second voltage threshold Vth2. At this time, it means that the first energy storage unit 410 has stored enough power. The second voltage comparison circuit VCOMP2 may be implemented by any commonly used voltage comparator.

The driving unit 460 may include a third electronic switch SW3 and a fourth electronic switch SW4. The third electronic switch SW3 is connected between the second energy storage unit 450 and a control terminal of the fourth electronic switch SW4, and a control terminal of the third electronic switch SW3 receives the first enable signal EN1. The fourth electronic switch SW4 is connected between the first energy storage unit 410 and the reclosing apparatus 140. When the timing unit 420 outputs the first enable signal and the voltage of the second energy storage unit 450 reaches the first voltage threshold Vth1, the third electronic switch SW3 and the fourth electronic switch SW4 are turned on, so that the power stored by the first energy storage unit 410 may be provided to the reclosing apparatus 140. The first voltage threshold Vth1 only needs to be large enough to turn on the fourth electronic switch SW4.

In the embodiments of the present disclosure, when the third electronic switch SW3 is a MOS transistor, its gate is the control terminal, which is connected to the output terminal of the timing unit 420; its source and drain are respectively connected to the control terminal of the fourth electronic switch SW4 and the second energy storage unit 450. When the fourth electronic switch SW4 is a MOS transistor, its gate is the control terminal, which is connected to the source of the third electronic switch SW3; its source and drain are respectively connected to the reclosing apparatus 140 and the first energy storage unit 410.

As mentioned above, the predetermined condition may further require that the motor has been powered off. In this case, in addition to the third electronic switch SW3 and the fourth electronic switch SW4, the driving unit may also include a fifth electronic switch SW5. The fifth electronic switch SW5 is connected between the control terminal of the fourth electronic switch SW4 and the reference ground, and a control terminal of the fifth electronic switch SW5 is connected to a power input terminal V430 of the control unit 430. After the fifth electronic switch SW5 is added, before the motor is powered off, due to the presence of the voltage at the power input terminal V430 of the control unit 430, the fifth electronic switch SW5 is turned on, so that even if the timing unit 420 outputs the first enable signal and the voltage of the second energy storage unit 450 reaches the first voltage threshold Vth1, the driving apparatus 400 does not drive the reclosing apparatus 140, but the second energy storage unit 450 discharges through the fifth electronic switch SW5. After the motor is powered off, the fifth electronic switch SW5 is turned off so that the second energy storage unit 450 does not discharge. Therefore, only after the timing unit 420 outputs the first enable signal EN1, the voltage of the second energy storage unit 450 reaches the first voltage threshold Vth1 and the motor is powered off, the power stored by the first energy storage unit 410 is provided to the reclosing apparatus 140.

In the embodiments of the present disclosure, when the fifth electronic switch SW5 is a MOS transistor, its gate is the control terminal, which is connected to the power input terminal of the control unit 430; its source and drain are respectively connected to the reference ground and the control terminal of the fourth electronic switch SW4.

Figure 5:
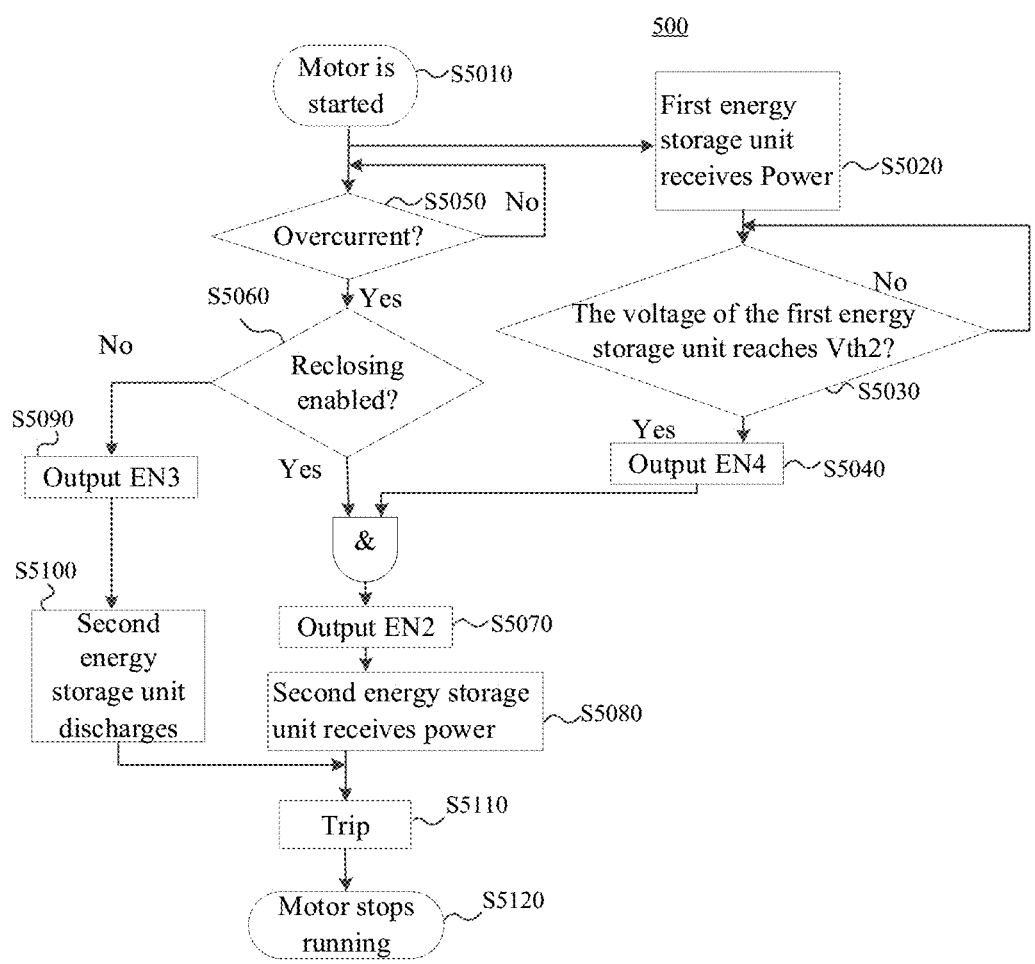
FIG. 5 shows a working flow chart of a driving apparatus in a process from the start of a motor to the power-off of the motor due to thermal overload according to an embodiment of the present disclosure.

FIG. 5 shows a working flow chart of a driving apparatus in a process from the start of a motor to the power-off of the motor due to thermal overload according to an embodiment of the present disclosure. The flow chart of FIG. 5 will be briefly described below with reference to the structure of the driving apparatus in FIG. 4. At S5010, the motor is started and power begins to be input to the driving apparatus. At S5020, the first energy storage unit 410 receives power. If the enabling unit 470 determines at S5030 that the voltage of the first energy storage unit 410 reaches the second voltage threshold Vth2, then at S5040, the enabling unit 470 outputs the fourth enable signal EN4. On the other hand, at S5050, the control unit 430 detects whether there is an overcurrent. If there is an overcurrent, the control unit 430 further determines whether the reclosing function is enabled at S5060. If it is determined that the reclosing function is enabled and the fourth enable signal EN4 is received, the control unit 430 outputs the second enable signal EN2 at S5070, and the second energy storage unit 450 receives power at S5080. Otherwise, if it is determined that the reclosing function is not enabled, the control unit 430 outputs the third enable signal EN3 at S5090, and the second energy storage unit 450 discharges at S5100. After that, the control unit 450 issues a trip command at S5110, and the trip apparatus operates. The motor is powered off and stops running at S5120.

Figure 6:
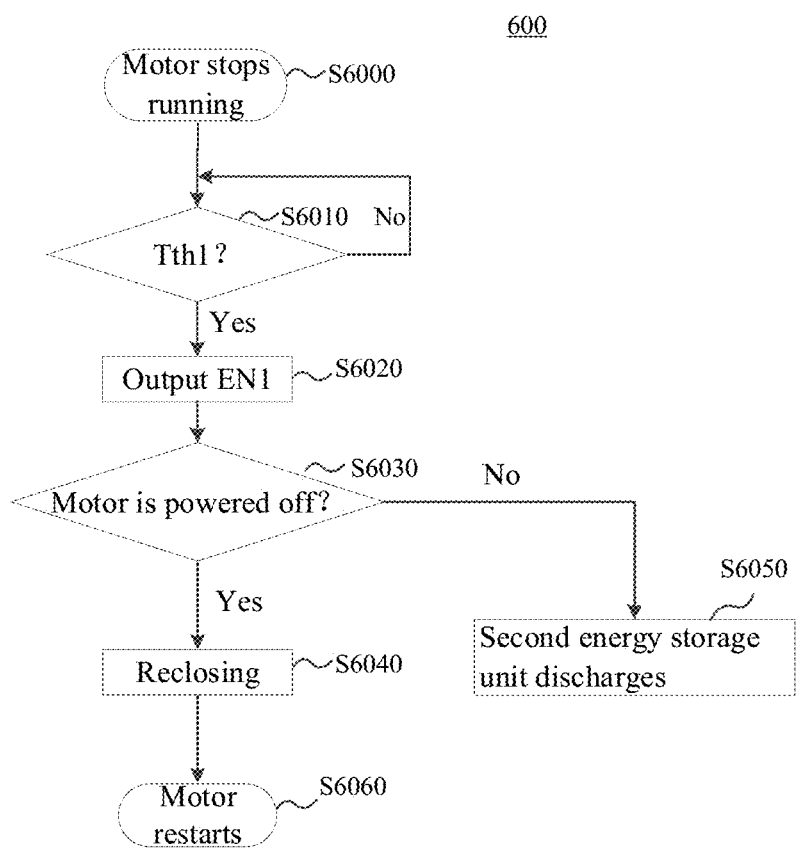
FIG. 6 shows a working flow chart of a driving apparatus in a process from the power-off of a motor to the restart of the motor due to reclosing according to an embodiment of the present disclosure.

FIG. 6 shows a working flow chart of a driving apparatus in a process from the power-off of a motor to the restart of the motor due to reclosing according to an embodiment of the present disclosure. The flow chart of FIG. 6 will be briefly described below with reference to the structure of the driving apparatus in FIG. 4. At S6000, the motor is powered off and in a stop-running state, and the first energy storage unit 410 supplies power to the timing unit 420. At S6010, the timing unit 420 determines whether the power-off time of the motor reaches the first time threshold Tth1 based on the voltage of the first energy storage unit 410. If it is determined at S6010 that the power-off time reaches the first time threshold Tth1, then at S6020, the timing unit 420 outputs the first enable signal EN1. At S6030, the driving unit 460 performs different operations based on whether the motor is powered off. If the motor is still running, at S6050, the driving unit 460 enables the second energy storage unit 450 to discharge. If the motor stops running, at S6040, the driving unit 460 determines that the predetermined condition (the timing unit 420 outputs the first enable signal EN1, the voltage of the second energy storage unit 450 reaches the first voltage threshold Vth1, and the motor is powered off) is satisfied, therefore the power stored in the first energy storage unit 410 is provided to the reclosing apparatus 140, and the reclosing apparatus 140 performs reclosing. At S6060, the motor restarts.

Figure 7:
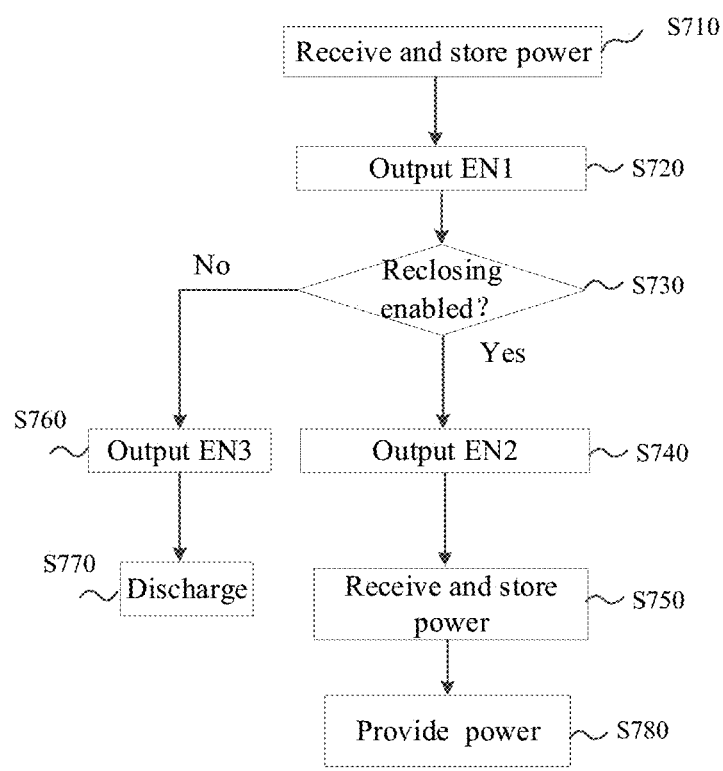
FIG. 7 shows a flowchart of a driving method according to an embodiment of the present disclosure.

FIG. 7 shows a flowchart of a driving method 700 according to an embodiment of the present disclosure. The driving method 700 may be applied to the driving apparatus for the reclosing apparatus, such as the driving apparatus described above in FIGS. 1-4. The driving apparatus is supplied with power through direct current converted from alternating drive current of the motor by the rectifier apparatus. The driving method 700 may include steps S710-S780. At step S710, one energy storage unit in the driving apparatus receives and stores power. At step S720, the driving apparatus outputs the first enable signal EN1 after the power-off time of the motor reaches the first time threshold Tth1. At step S730, the driving apparatus identifies whether the reclosing function is enabled. If the reclosing function is enabled, the driving apparatus outputs the second enable signal EN2 at step S740, and at step S750, another energy storage unit of the driving apparatus receives and stores power. If the reclosing function is not enabled, the driving apparatus outputs the third enable signal EN3 at step S760, and at step S770, the another energy storage unit discharges. At step S780, the driving apparatus provides power to the reclosing apparatus based on the predetermined conditions being satisfied. The predetermined conditions may require that the first enable signal EN1 is output and the voltage of the second energy storage unit in the driving apparatus reaches the first voltage threshold Vth1.

The above steps may be performed by any suitable hardware of the driving apparatus or hardware combined with software. For example, step S710 may be performed by the above-mentioned first energy storage unit, step S720 may be performed by the above-mentioned timing unit, steps S730, S740, and S760 may be performed by the above-mentioned control unit, and steps S750 and S770 may be performed by the second energy storage unit which is controlled by the first power supply unit based on the second enable signal EN2 or the third enable signal EN3, and step S780 may be performed by the driving unit.

As discussed above, the predetermined condition in step S780 may also require that the motor has been powered off.

In addition, the driving method 700 may further include: outputting the fourth enable signal EN4 by the enabling unit based on determining that the voltage of the first energy storage unit reaches the second voltage threshold Vth2, and in step S750, when both the second the enable signal EN2 and the fourth enable signal EN4 are received, the first power supply unit enables the second energy storage unit to receive power.

In addition, the driving method 700 may further include: before step S710, receiving power and increasing the voltage output to the first energy storage unit by the above-mentioned second power supply unit.

In addition, step S740 may further include: outputting the second enable signal EN2 by the control unit based on determining that the reclosing function is enabled and the fourth enable signal EN4 is received.

According to the driving method of the embodiments of the present disclosure, there is no need for the MCU to participate in the timing operation after the power is cut off due to the trip, so that there is no need to deliberately select an MCU of low-power consumption. In addition, the driving method of the embodiments of the present disclosure may enable the user to select whether to enable the reclosing function, thereby giving the user more freedom of choice.

The whole or its components of the hardware computing apparatus described in the present disclosure may be implemented by various suitable hardware means, including but not limited to FPGA, ASIC, SoC, discrete gate or transistor logic, discrete hardware components, or any combination thereof.

The block diagrams of circuits, means, apparatuses, devices, and systems involved in the present disclosure are merely illustrative examples and are not intended to require or imply that they must be connected, arranged, and configured in the manner shown in the block diagrams. As those skilled in the art will recognize, these circuits, means, apparatuses, devices, and systems may be connected, arranged, and configured in any manner, as long as the desired purpose may be achieved.

Those skilled in the art should understand that the above-mentioned specific embodiments are only examples and not limitations. Various modifications, combinations, partial combinations and substitutions may be made to the embodiments of the present disclosure according to design requirements and other factors, as long as they are within the scope of the appended claims or their equivalents, that is, they belong to the scope claimed to be protected by the present disclosure.

What is claimed is:

1. A driving apparatus for a reclosing apparatus, the driving apparatus being supplied with power through direct current converted from alternating drive current of a motor by a rectifier apparatus, and the driving apparatus comprising a first energy storage unit, a timing unit, a control unit, a first power supply unit, a second energy storage unit, and a driving unit, wherein,
   the first energy storage unit is configured to receive and store the power, and supply power to the timing unit and the reclosing apparatus;
   the timing unit is configured to output a first enable signal after determining that a power-off time of the motor reaches a first time threshold based on a voltage of the first energy storage unit;
   the control unit is configured to output a second enable signal based on a reclosing function being enabled, and output a third enable signal based on determining that the reclosing function is not enabled;
   the first power supply unit is configured to enable the second energy storage unit to receive the power when receiving the second enable signal, and to enable the second energy storage unit to discharge when receiving the third enable signal;
   the second energy storage unit is configured to receive and store the power via the first power supply unit; and
   the driving unit is configured to provide the power stored in the first energy storage unit to the reclosing apparatus when a predetermined condition is satisfied, and the predetermined condition requires that the timing unit outputs the first enable signal and a voltage of the second energy storage unit reaches a first voltage threshold.

2. The driving apparatus of claim 1, wherein the driving apparatus further comprises an enabling unit configured to output a fourth enable signal based on determining that the voltage of the first energy storage unit reaches a second voltage threshold, and
   the first power supply unit enables the second energy storage unit to receive the power when receiving both the second enable signal and the fourth enable signal.

3. The driving apparatus of claim 2, wherein the first power supply unit comprises a charging circuit and a discharging circuit, and the charging circuit is connected between an output terminal of the rectifier apparatus and the second energy storage unit, and the discharging circuit is connected between a reference ground and the second energy storage unit.

4. The driving apparatus of claim 3, wherein,
   the charging circuit comprises a first electronic switch and a logic AND circuit, the first electronic switch is connected between the output terminal of the rectifier apparatus and the second energy storage unit, and two input terminals of the logic AND circuit are respectively connected to a first output terminal of the control unit and an output terminal of the enabling unit, and an output terminal of the logic AND circuit is connected to a control terminal of the first electronic switch;

the discharging circuit comprises a second electronic switch, the second electronic switch is connected between the reference ground and the second energy storage unit, and a second output terminal of the control unit is connected to a control terminal of the second electronic switch.

5. The driving apparatus of claim 2, wherein, the control unit outputs the second enable signal based on the reclosing function being enabled and receiving the fourth enable signal.

6. The driving apparatus of claim 2, wherein the enabling unit comprises a second voltage comparison circuit, an input terminal of the second voltage comparison circuit is connected to the first energy storage unit to obtain its voltage, and an output terminal of the second voltage comparison circuit is connected to the first power supply unit.

7. The driving apparatus of claim 1, wherein the predetermined condition also requires that the motor has been powered off.

8. The driving apparatus of claim 7, wherein the driving unit comprises a third electronic switch, a fourth electronic switch, and a fifth electronic switch, wherein, the third electronic switch is connected between the second energy storage unit and a control terminal of the fourth electronic switch, and a control terminal of the third electronic switch receives the first enable signal;

the fourth electronic switch is connected between the first energy storage unit and the reclosing apparatus; and the fifth electronic switch is connected between the control terminal of the fourth electronic switch and a reference ground, and a control terminal of the fifth electronic switch is connected to a power input terminal of the control unit.

9. The driving apparatus of claim 1, wherein the driving apparatus further comprises a second power supply unit connected between the rectifier apparatus and the first energy storage unit for receiving the power and increasing a voltage output to the first energy storage unit.

10. The driving apparatus of claim 9, wherein the second power supply unit comprises a booster circuit.

11. The driving apparatus of claim 1, wherein the first energy storage unit comprises a first capacitor.

12. The driving apparatus of claim 1, wherein the timing unit comprises a first voltage comparison circuit, an input terminal of the first voltage comparison circuit is connected to the first energy storage unit to obtain its voltage, and an output terminal of the first voltage comparison circuit is connected to the driving unit.

13. The driving apparatus of claim 1, wherein the control unit comprises a micro control unit (MCU).

14. The driving apparatus of claim 1, wherein the second energy storage unit comprises a second capacitor.

15. The driving apparatus of claim 1, wherein the driving unit comprises a third electronic switch and a fourth electronic switch, wherein, the third electronic switch is connected between the second energy storage unit and a control terminal of the fourth electronic switch, and a control terminal of the third electronic switch receives the first enable signal; and the fourth electronic switch is connected between the first energy storage unit and the reclosing apparatus.

16. A driving method applied to a driving apparatus for a reclosing apparatus, the driving apparatus being supplied with power through direct current converted from alternating drive current of a motor by a rectifier apparatus, and the driving apparatus comprises a first energy storage unit, a timing unit, a control unit, a first power supply unit, a second energy storage unit, and a driving unit, the driving method comprising:

receiving and storing the power by the first energy storage unit;

outputting a first enable signal, by the timing unit, after determining that a power-off time of the motor reaches a first time threshold based on a voltage of the first energy storage unit;

outputting a second enable signal based on a reclosing function being enabled, and outputting a third enable signal based on determining that the reclosing function is not enabled by the control unit;

enabling the second energy storage unit to receive the power by the first power supply unit when receiving the second enable signal, and enabling the second energy storage unit to discharge by the first power supply unit when receiving the third enable signal; and providing, by the driving unit, the power stored in the first energy storage unit to the reclosing apparatus when a predetermined condition is satisfied, and the predetermined condition requiring that the timing unit outputs the first enable signal and a voltage of the second energy storage unit reaches a first voltage threshold.

17. The driving method of claim 16, wherein the driving apparatus further comprises an enabling unit, and the driving method further comprises:

outputting a fourth enable signal, by the enabling unit, based on determining that the voltage of the first energy storage unit reaches a second voltage threshold, and enabling the second energy storage unit, by the first power supply unit, to receive the power when receiving both the second enable signal and the fourth enable signal.

18. The driving method of claim 17, further comprising:

outputting the second enable signal, by the control unit, based on determining that the reclosing function is enabled and receiving the fourth enable signal.

19. The driving method of claim 16, wherein the predetermined condition further requires that the motor has been powered off.

20. The driving method of claim 16, wherein the driving apparatus further comprises a second power supply unit, and receiving and storing the power by the first energy storage unit further comprises: receiving the power and increasing a voltage output to the first energy storage unit by the second power supply unit.

* * * * *